United States Patent [19]

Clark et al.

[11] Patent Number: 4,551,804

[45] Date of Patent: Nov. 5, 1985

[54] APPROACH TO HOVER CONTROL SYSTEM FOR HELICOPTERS

[75] Inventors: Thomas R. Clark, Peoria; Carl D. Griffith, Phoenix, both of Ariz.

[73] Assignee: Sperry Corporation, New York, N.Y.

[21] Appl. No.: 464,825

[22] Filed: Feb. 8, 1983

[51] Int. Cl.[4] .......................... G06F 15/50; B64C 11/44

[52] U.S. Cl. .......................... 364/434; 364/433; 244/17.13; 244/181

[58] Field of Search .......................... 364/427, 428, 433, 434; 73/178 R, 178 H, 178 T; 318/584; 340/946, 967, 970, 977; 244/17.13, 180–182, 194

[56] References Cited

U.S. PATENT DOCUMENTS 3,521,838 7/1970 Buffum et al. .......................... 318/584

3,916,688 11/1975 Dendy et al. .......................... 73/178 T 4,004,756 1/1977 Gerstine et al. .......................... 364/434

4,029,271 6/1977 Murphy et al. .......................... 364/434

4,213,584 7/1980 Teff et al. .......................... 244/17.13

*Primary Examiner*—Gary Chin

*Attorney, Agent, or Firm*—Howard P. Terry; Albert B. Cooper

[57] ABSTRACT

An approach to hover control system for a helicopter in which a constant deceleration is commanded at an initial approach speed and then the actual deceleration as a time function of the airspeed from the initial airspeed to a second airspeed is measured. Based on these measures, the total deceleration time to approach to a hover condition can be predicted accurately after which the commanded deceleration is removed.

9 Claims, 2 Drawing Figures

APPROACH TO HOVER CONTROL SYSTEM FOR HELICOPTERS

BACKGROUND OF THE INVENTION

1. Field of the Invention

The present invention relates generally to flight control systems for helicopters. More specifically, the invention relates to a fully automatic or semi-automatic (e.g. flight director) control system for helicopters for controlling the approach of the helicopter and a hover condition without the requirement of sophisticated and expensive low airspeed sensors, Doppler radar or precision position sensors.

2. Description of the Prior Art

The automatic and semi-automatic control of a helicopter from some initial, presumably high airspeed to a hover condition at zero or substantially zero airspeed has successfully been accomplished in the past; see for example the present assignee's U.S. Pat. Nos. 3,521,838 and 3,916,688 to R. S. Buffum et al and J. C. Dendy et al respectively. As explained fully therein, the control of helicopter longitudinal velocity requires accurate measures of helicopter acceleration, velocity and position and sensors of these parameters such as low-speed air data sensors, Doppler radar and microwave landing system receivers, are very complex and costly. The above Buffum et al patent describes a system for precisely hovering a helicopter using accelerometers to maintain tight velocity control on a short term basis. However, long term stability depends upon the verticality errors (long term drift and effects of acceleration) of the vertical reference used to stabilize the accelerometer. The above Dendy et al patent describes an approach to hover control system wherein the acceleration derived velocity term is improved by including an accurate measure of range-to-hover from a precision approach radar or microwave landing system. Since the latter system requires ground based references, its use is limited to specific geographical areas.

The present invention provides performance comparable with the above more sophisticated systems at a fraction of their costs.

SUMMARY OF THE INVENTION

The present invention overcomes the shortcomings of the prior art systems especially in terms of required equipment sophistication and costs, in that only conventional low-cost on-board sensors are used. In the present system, a constant deceleration is commanded using a vertical gyro referenced longitudinal accelerometer as the feedback sensor. Although the actual deceleration achieved may vary from one condition to another due to verticality errors in the vertical gyro or vertical reference system, the actual deceleration achieved under each condition is measured as a time function of the change in velocity from an initial velocity to a lower velocity, such velocities preferably being high enough to be accurately sensed by a conventional airspeed sensor. Having measured the actual deceleration achieved between these velocities, the remainder of the deceleration to hover, or to any airspeed below the capability of the conventional airspeed sensor, may be accurately predicted.

BRIEF DESCRIPTION OF THE DRAWINGS

A preferred embodiment of the present invention is illustrated in the accompanying drawings wherein.

DETAILED DESCRIPTION OF THE PREFERRED EMBODIMENT

Figure 1:
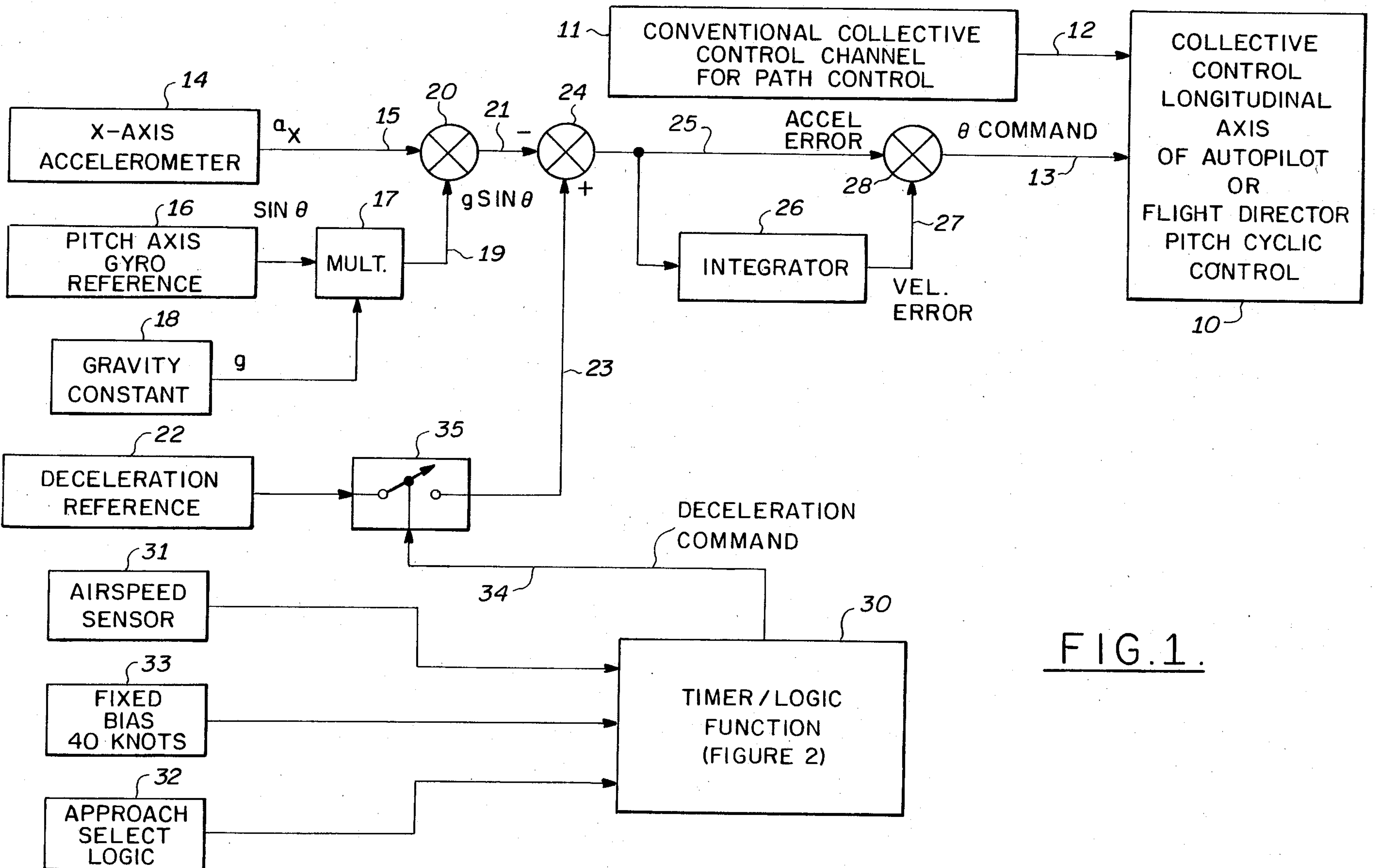
FIG. 1 is a block diagram of the longitudinal control axis of a helicopter autopilot or flight director system incorporating the present invention.

As is well known to those skilled in the helicopter flight control art, and as described in some detail in applicants' assignee's copending application Ser. No. 466,815 filed Feb. 16, 1983 in the names of E. Schutecki and C. Griffith and entitled "Three-Cue Flight Director for Helicopters", during longitudinal flight path control modes of operation at speeds of say 60 knots and under, flight path errors are maintained at a minimum by controlling the direct lift of the helicopter through rotor collective pitch while airspeed errors are maintained at a minimum by controlling the pitch attitude of the helicopter through rotor cyclic pitch. Both of these controls are required to perform an approach to hover as illustrated in FIG. 1, wherein the basic longitudinal axis of a conventional helicopter autopilot and/or flight director is designated by reference character 10. The collective axis controls the vertical velocity to descend at a predetermined fixed vertical rate and then captures and maintains a predetermined fixed hover altitude, say 50 feet. This maneuver is accomplished by conventional collective control channel 11 normally using derived barometric altitude rate, vertical acceleration and radio altitude to provide a collective pitch command signal on lead 12. Since this collective control technique is well known and well understood by those skilled in this art, it need not be repeated herein. The present invention is primarily concerned with controlling helicopter velocity through cyclic control of pitch attitude. The pitch attitude command channel used to control the deceleration approach to hover is illustrated in the lower portion of FIG. 1, the output command signal on lead 13 being supplied to the pitch cyclic control of the autopilot/flight director 10.

An accelerometer 14 is fixed to the aircraft so that it measures aircraft acceleration along its longitudinal axis and supplies a signal $A_X$ on lead 15 proportional thereto. In order to provide a signal proportional to inertial longitudinal acceleration, a vertical reference 16, such as a vertical gyroscope provides a signal proportional to the sine of aircraft pitch attitude, $\sin\theta$, which is multiplied by multiplier 17, by the gravity constant g from a voltage source 18 to provide on lead 19 a signal proportional to $g \sin\theta$. This signal is subtracted from the accelerometer signal at summing junction 20 to provide the required inertial acceleration signal on lead 21, that is, the acceleration of the helicopter relative to the ground.

In accordance with the present invention, when the pilot wishes to approach a hover condition or some desired low airspeed, he selects the approach mode on a conventional mode selector which, as will be described in detail below, inserts a predetermined deceleration command signal into the system from deceleration reference 22 on lead 23. This command signal is compared at summing junction 24 with the actual acceleration signal on lead 21 to provide an acceleration error signal on lead 25. This signal is integrated by integrator 26 to provide a velocity error signal on lead 27. The acceleration error signal and velocity error signal are summed at junction 28 to provide a pitch command on lead 13 to the autopilot/flight director 10. The autopilot pitches the aircraft as required to achieve zero acceleration error.

Figure 2:
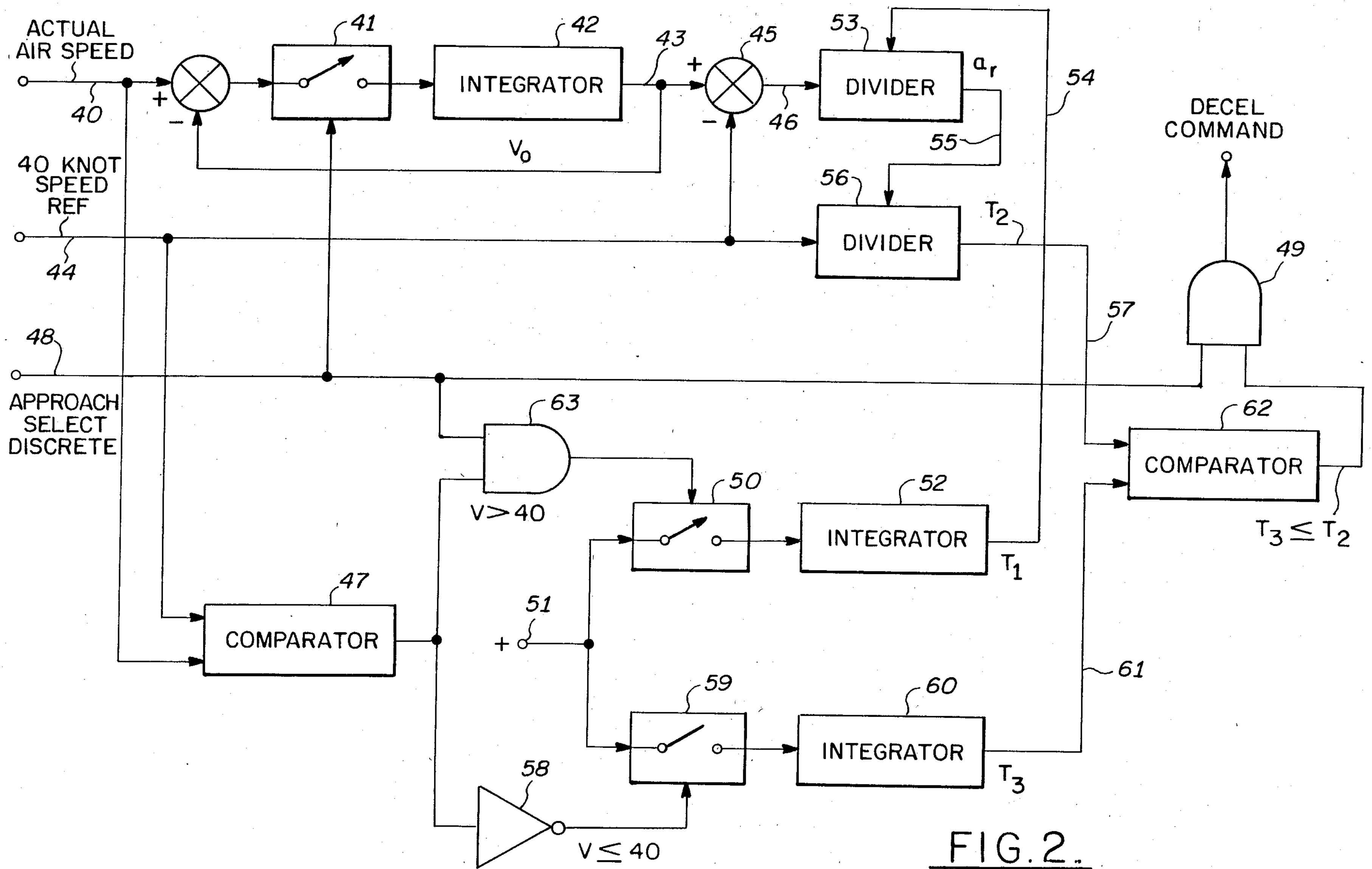
FIG. 2 is a detailed block diagram of the timing and logic function shown generally in FIG. 1.

The computed inertial acceleration signal on lead 21 may be unpredictable because the vertical reference signal may include errors due to dynamic errors which effect its verticality, such as the dynamics of its erection system during maneuvers, including the deceleration and approach maneuver. These errors will normally show up as a drift of the velocity integrator 26 resulting in inconsistency in the velocity control during the approach to hover maneuver. The present invention overcomes such inconsistencies through the deceleration command timing and logic control 30 which receives a control signal from the helicopter airspeed sensor 31, a mode select discrete from the approach mode selector 32 and a fixed bias signal corresponding to a predetermined airspeed from airspeed bias source 33. The timer/logic control 30 provides an acceleration command signal on lead 34 which, through switch 35 engages and disengages the deceleration command signal on lead 23. The details of the timing/logic junction 30 are illustrated in FIG. 2.

In accordance with the present invention, the time $T_1$ required to decelerate the helicopter from the airspeed existing at approach mode engage, typically about 60 knots, to a predetermined lower airspeed typically 40 knots and accurately measurable by the airspeed sensor 31, under control of the deceleration command signal, is an accurate measure of the average deceleration of the helicopter to 40 knots. This time $T_1$ is used to predict the time $T_2$ required to decelerate, under the control of the same deceleration command, the helicopter to zero airspeed or hover at the actually achieved deceleration level. When the airspeed passes through 40 knots, a second timer (same as timer for $T_1$) is initiated, and when its time $T_3$ equals the predicted time $T_2$, the airspeed will be zero (or essentially zero) and the deceleration command signal is removed. Thereafter, the helicopter is stabilized over the hover position in the manner taught by the above Buffum et al patent. The foregoing overall function is provided by the timing/logic control 30 and will now be described.

Assume the helicopter is cruising at an initial airspeed of say 60 knots. An airspeed signal proportional thereto is supplied by airspeed sensor 31 and appears at lead 40. Since the pilot has not yet selected the approach mode, switch 41 is closed, closing the loop around integrator 42 so that its output on lead 43 represents the actual airspeed; $V_0 = 60$ kts. A fixed bias signal having a value proportional to 40 knots is supplied from source 33 and appears on lead 44. This signal is supplied to summing junction 45 where it is subtracted from the initial airspeed signal on lead 43, the difference appearing on lead 46. Further, it is also applied to a comparator 47 where it is compared with the actual airspeed signal on lead 40. As will become apparent, since the approach mode has not yet been selected, the airspeed is greater than 40 knots and the output of $T_3$, $T_2$ comparator is a logic high, the deceleration command engage signal is low and switch 35 (FIG. 1) is open.

Now assume the pilot engages the approach mode. A mode select discrete (a logic high) from mode selector 32 appears on lead 48 which signal opens switch 41 clamping integrator 42 so that the signal on lead 43 maintains its 60 knot value. This mode discrete is also supplied to AND gate 49 causing its output to go high closing switch 35 and supplying the predetermined deceleration command signal to the autopilot/flight director and causing the helicopter to initiate its deceleration maneuver. The approach select discrete is also supplied to AND gate 63 which also receives the output of comparator 47. Since the output of comparator 47 is high when the actual airspeed is greater than 40 knots, the gate output is high closing switch 50 and supplying a constant voltage from source 51 to a first integrator 52. Integrator 52 starts effectively to measure the time $T_1$ that the helicopter takes to decelerate from the initial 60 knots to the intermediate speed of 40 knots. Meanwhile the difference between the initial 60 knot speed and the reference 40 knot speed is applied as the dividend of a divider 53, the divisor of which is the time interval $T_1$ on lead 54 from timer 52. Thus, the divider 53 performs the function $$a_r = (V_0 - 40)/T_1$$

which is the average deceleration level achieved from mode engagement to 40 knots. This signal appears on output lead 55. A second divider 56 is supplied as its dividend the reference 40 knot airspeed signal and as its divisor, the average deceleration signal $a_r$ on lead 55. Thus, the divider 56 performs the function $$T_2 = 40/a_r$$

which is the predicted time required to decelerate the helicopter to zero airspeed at the actual average deceleration level. This signal $T_2$ appears on lead 57.

When the 40 knot airspeed is reached as detected by comparator 47, the comparator output goes to logic low. However, since this low signal is applied to an inverter 58, the output of the latter goes high closing switch 59 and thereby supplying the same voltage from source 51 to a second integrator 60 having the same time constant as integrator 52. The output $T_3$ of integrator 60 appears on lead 61 and represents the actual accumulated time the aircraft is decelerating from 40 knots airspeed. The predicted time to hover $T_2$ and the actual deceleration time $T_3$ are compared in comparator 62, the output of which is a logic high until the time $T_3$ becomes equal to or less than $T_2$. At this time, the helicopter has decelerated to zero airspeed and its output goes to a logic low. This removes one of the inputs to AND gate 49 which in turn changes its output from high to low opening switch 35 and removing the deceleration command from the autopilot/flight director 10.

From the foregoing, it is evident that the present invention provides a low cost apparatus for performing an automatic (or semi-automatic) approach to hover for a helicopter. Only conventional inertial and air data sensors are used, eliminating the need for a Doppler radar or low airspeed sensor. By commanding a constant deceleration and then measuring the actual deceleration level as a time function of airspeed from an initial high speed to a predetermined lower airspeed, the total deceleration time to approach a hover condition can be predicted accurately.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. A pitch axis control system for controlling a deceleration maneuver of a helicopter from an initial airspeed to a hover condition comprising (a) means for providing a first time measure proportional to the time required to decelerate from said initial airspeed to an airspeed intermediate said initial airspeed and hover, (b) means responsive to said first time measure for providing a second time measure proportional to the predicted time required to decelerate from said intermediate airspeed to hover, (c) means for providing a third time measure proportional to the time during which said helicopter is actually decelerating between said intermediate airspeed and hover, (d) first comparator means for comparing said second and third time measures, and (e) means responsive to said first comparator means for terminating said deceleration maneuver when said second and third time measures become equal.

2. A helicopter control system as set forth in claim 1 further comprising (a) means for providing a deceleration command signal having a predetermined value, (b) means for selecting said deceleration maneuver and for supplying said command signal to said pitch axis control system, and (c) logic means responsive to said selecting means for initiating said first and second time measure providing means.

3. A helicopter control system as set forth in claim 2 further comprising (a) second comparator means responsive to the difference between the actual airspeed and said intermediate airspeed for further controlling said logic means.

4. A helicopter control system as set forth in claim 1 wherein said second time measure providing means comprises (a) first computer means responsive to the difference between said initial airspeed and said intermediate airspeed and to said first time measure for computing the average deceleration of said helicopter between said airspeeds.

5. A helicopter control system as set forth in claim 4 wherein said second time measure providing means further comprises (a) means responsive to said intermediate airspeed and the output of said first computer means for terminating said deceleration maneuver.

6. The helicopter control system as set forth in claim 2 wherein said first time measure providing means comprises (a) means for providing a reference signal (b) first integrator means, and (c) means responsive to said logic means for supplying said reference signal to said first integrator means.

7. The helicopter control system as set forth in claim 3 wherein said third time measure providing means comprises (a) means for providing a reference signal, (b) second integrator means (c) further logic means responsive to said second comparator means, and (d) means responsive to said further logic means for supplying said reference signal to said second integrator means.

8. The helicopter control system as set forth in claim 2 wherein said means for terminating said deceleration maneuver comprises (a) further logic means responsive to said maneuver selecting means and said first comparator means for removing said deceleration command signal from control of said pitch axis control system.

9. A method of controlling the approach of a helicopter from an initial airspeed to a hover condition through control of the helicopter pitch attitude comprising (a) initiating a pitch attitude maneuver in accordance with a predetermined commanded helicopter deceleration, (b) measuring the time interval $T_1$ between said maneuver initiation at said initial airspeed and the achievement of an airspeed intermediate said initial airspeed and hover, (c) predicting the time interval $T_2$ between achieving said intermediate airspeed and achieving hover said time interval $T_2$ being a function of said time interval $T_1$ according to the following relationship $$T_2 = V_I T_1 / (V_o - V_I)$$

where $V_I$=said intermediate airspeed $V_O$=said initial airspeed (d) accumulating a time interval $T_3$ said time interval $T_3$ beginning at said intermediate airspeed and continuing until hover, (e) comparing the predicted time measure $T_2$ with the accumulated time measure $T_3$, and (f) terminating said maneuver when said time intervals $T_2$ and $T_3$ are equal.

* * * * *